United States Patent
Edmonson et al.

(10) Patent No.: US 12,447,348 B2
(45) Date of Patent: Oct. 21, 2025

(54) SECONDARY VERIFICATION OF MRI EXPOSURE AT AN IMPLANTABLE MEDICAL DEVICE

(71) Applicant: MEDTRONIC, INC., Minneapolis, MN (US)

(72) Inventors: Jonathan D. Edmonson, Blaine, MN (US); Michael W. Heinks, New Brighton, MN (US)

(73) Assignee: Medtronic, Inc., Minneapolis, MN (US)

( * ) Notice: Subject to any disclaimer, the term of this patent is extended or adjusted under 35 U.S.C. 154(b) by 352 days.

(21) Appl. No.: 17/989,599

(22) Filed: Nov. 17, 2022

(65) Prior Publication Data

US 2023/0181912 A1 Jun. 15, 2023

Related U.S. Application Data

(60) Provisional application No. 63/290,043, filed on Dec. 15, 2021.

(51) Int. Cl.
*A61N 1/37* (2006.01)
*A61N 1/365* (2006.01)
*A61N 1/372* (2006.01)

(52) U.S. Cl.
CPC ........ *A61N 1/3718* (2013.01); *A61N 1/36542* (2013.01); *A61N 1/37217* (2013.01)

(58) Field of Classification Search
CPC .................................................... A61N 1/3718
See application file for complete search history.

(56) References Cited

U.S. PATENT DOCUMENTS 5,174,289 A 12/1992 Cohen
5,722,998 A 3/1998 Prutchi et al.
(Continued)

FOREIGN PATENT DOCUMENTS

| CN | 106110503 | 11/2016 |
| EP | 1935450 A1 | 6/2008 |
| WO | 2010126935 A2 | 11/2010 |

OTHER PUBLICATIONS

PCT/IB2022/061272 International Search Report and Written Opinion, Feb. 17, 2023.
(Continued)

*Primary Examiner* — William J Levicky
(74) *Attorney, Agent, or Firm* — Shumaker & Sieffert, P.A.

(57) ABSTRACT

Implantable medical devices include a first sensor for detecting a magnetic field that indicates an exposure mode of operation is appropriate. The implantable medical devices include a second sensor for detecting whether an MRI characteristic is present that indicates whether MRI or non-MRI post exposure diagnostics and other actions should be implemented and may also indicate whether the exposure mode should be MRI or non-MRI specific. An MRI post exposure diagnostic may perform pacing capture threshold tests and the post exposure pacing amplitude output may be kept at a higher than normal level. The second sensor may be an overvoltage clamp circuit of a telemetry coil that indicates whether an overvoltage condition on the telemetry coil is occurring to indicate whether an MRI characteristic is present. The second sensor may be a second threshold magnetic sensor, an accelerometer, or a microphone to indicate whether an MRI characteristic is present.

25 Claims, 8 Drawing Sheets

(56) References Cited

U.S. PATENT DOCUMENTS

| | | | |
|---|---|---|---|
| 5,978,710 | A | 11/1999 | Prutchi et al. |
| 6,937,906 | B2 | 8/2005 | Terry et al. |
| 7,039,810 | B1 | 5/2006 | Nichols |
| 7,050,855 | B2 | 5/2006 | Zeijlemaker et al. |
| 7,076,283 | B2 | 7/2006 | Cho et al. |
| 7,212,863 | B2 | 5/2007 | Strandberg |
| 7,561,915 | B1 | 7/2009 | Cooke et al. |
| 7,623,930 | B2 | 11/2009 | Zeijiemaker et al. |
| 7,697,988 | B2 | 4/2010 | Clement et al. |
| 8,014,867 | B2 | 9/2011 | Cooke et al. |
| 8,046,063 | B2 | 10/2011 | Betzold |
| 8,121,678 | B2 | 2/2012 | Linder et al. |
| 8,200,334 | B1 | 6/2012 | Min et al. |
| 8,433,408 | B2 | 4/2013 | Ellingson et al. |
| 8,437,862 | B2 | 5/2013 | Yoon et al. |
| 8,467,882 | B2 | 6/2013 | Ellingson et al. |
| 8,538,550 | B2 | 9/2013 | Stubbs et al. |
| 8,554,318 | B2 | 10/2013 | Legay |
| 8,737,862 | B2 | 5/2014 | Manico et al. |
| 8,744,578 | B2 | 6/2014 | Ellingson |
| 8,805,496 | B2 | 8/2014 | Ellingson |
| 8,818,506 | B2 | 8/2014 | Legay |
| 8,886,317 | B2 | 11/2014 | Cooke et al. |
| 8,896,462 | B2 | 11/2014 | Skoldengen et al. |
| 8,929,995 | B2 | 1/2015 | Stancer et al. |
| 9,008,788 | B2 | 4/2015 | Jenison |
| 9,095,721 | B2 * | 8/2015 | Stancer .................. A61N 1/3718 |
| 9,138,584 | B2 | 9/2015 | Stancer et al. |
| 9,174,058 | B2 | 11/2015 | Ellingson et al. |
| 9,272,152 | B2 | 3/2016 | Lalonde et al. |
| 9,919,158 | B2 | 3/2018 | Ellingson et al. |
| 10,130,282 | B2 | 11/2018 | Goetz |
| 10,130,822 | B2 | 11/2018 | Legay et al. |
| 10,293,167 | B2 | 5/2019 | Yoon et al. |
| 10,441,798 | B2 | 10/2019 | Yoon et al. |
| 10,493,286 | B2 | 12/2019 | Ellingson et al. |
| 10,668,292 | B2 | 6/2020 | Pei et al. |
| 10,744,320 | B2 | 8/2020 | Newman et al. |
| 10,981,010 | B2 | 4/2021 | Yoon et al. |
| 11,253,707 | B2 | 2/2022 | Yoon et al. |
| 11,478,647 | B2 | 10/2022 | Ellingson et al. |
| 11,724,111 | B2 | 8/2023 | Yoon et al. |
| 11,938,326 | B2 | 3/2024 | Yoon et al. |
| 2003/0144705 | A1 | 7/2003 | Funke |
| 2003/0144706 | A1 | 7/2003 | Funke |
| 2004/0024421 | A1 | 2/2004 | Ideker et al. |
| 2004/0030256 | A1 | 2/2004 | Lin |
| 2004/0254614 | A1 | 12/2004 | Spinelli et al. |
| 2005/0096708 | A1 | 5/2005 | Seim et al. |
| 2005/0149126 | A1 | 7/2005 | Libbus |
| 2006/0167496 | A1 | 7/2006 | Nelson et al. |
| 2006/0293591 | A1 | 12/2006 | Wahlstrand et al. |
| 2007/0179558 | A1 | 8/2007 | Gliner et al. |
| 2007/0265662 | A1 | 11/2007 | Ufford |
| 2008/0154342 | A1 | 6/2008 | Digby et al. |
| 2009/0138058 | A1 | 5/2009 | Cooke et al. |
| 2009/0157146 | A1 | 6/2009 | Linder et al. |
| 2010/0087892 | A1 * | 4/2010 | Stubbs .................. A61N 1/3718 607/28 |
| 2010/0137945 | A1 | 6/2010 | Gadagkar et al. |
| 2010/0137947 | A1 | 6/2010 | Gadagkar et al. |
| 2011/0093046 | A1 | 4/2011 | Ellingson et al. |
| 2011/0106204 | A1 | 5/2011 | Yoon et al. |
| 2011/0152672 | A1 | 6/2011 | Doerr et al. |
| 2011/0160565 | A1 | 6/2011 | Stubbs et al. |
| 2011/0160602 | A1 | 6/2011 | Stubbs et al. |
| 2011/0160791 | A1 | 6/2011 | Ellingson et al. |
| 2011/0160806 | A1 * | 6/2011 | Lyden .................. A61N 1/3718 607/63 |
| 2011/0187360 | A1 | 8/2011 | Maile et al. |
| 2011/0196450 | A1 | 8/2011 | McClure et al. |
| 2012/0221068 | A1 | 8/2012 | Ellingson |
| 2012/0245452 | A1 | 9/2012 | Doerr et al. |
| 2012/0253425 | A1 | 10/2012 | Yoon et al. |
| 2012/0277817 | A1 | 11/2012 | Ellingson et al. |
| 2013/0268012 | A1 | 10/2013 | Sison |
| 2013/0289384 | A1 | 10/2013 | Jenison et al. |
| 2013/0289638 | A1 * | 10/2013 | Newman .............. A61N 1/3718 607/9 |
| 2014/0100624 | A1 | 4/2014 | Ellingson |
| 2016/0015986 | A1 | 1/2016 | Seeberger |
| 2016/0151623 | A1 | 6/2016 | Doerr |
| 2016/0151624 | A1 | 6/2016 | Doerr |
| 2018/0140856 | A1 | 5/2018 | Lindevig et al. |
| 2019/0201701 | A1 | 7/2019 | Balczewski et al. |
| 2020/0230423 | A1 | 7/2020 | Chen et al. |
| 2023/0027466 | A1 | 1/2023 | Ellingson et al. |
| 2023/0061204 | A1 | 3/2023 | Edmonson et al. |
| 2023/0166114 | A1 | 6/2023 | Doerr et al. |
| 2023/0364430 | A1 | 11/2023 | Yoon et al. |
| 2024/0207620 | A1 | 6/2024 | Yoon et al. |

OTHER PUBLICATIONS

Kloostermann, Dr. E. Martin, MRI Remote Control Study (ROCON) Remote Management of Cardiac Devices Undergoing MRI, 7 pgs.

Kloostermann, Dr. E. Martin, MRI Remote Control Study (ROCON). Remote Management of Cardiac Devices Undergoing MRI, 30 pgs.

Kloostermann, Dr. E. Martin,, "Novel MRI Safe Mode Selection Algorithm Standardized Real-Time Solutions for a Varialbe Time-Dependent Problem", J. Clin Exp. Cardiology, Dec. 11-12, 2017, 22nd World Cardiology Conference.

* cited by examiner

SECONDARY VERIFICATION OF MRI EXPOSURE AT AN IMPLANTABLE MEDICAL DEVICE

RELATED APPLICATIONS

The present application claims priority to U.S. Prov. Application No. 63/290,043, filed on Dec. 15, 2021, and entitled SECONDARY VERIFICATION OF MRI EXPOSURE AT AN IMPLANTABLE MEDICAL DEVICE.

TECHNICAL FIELD

Embodiments are related to implantable medical devices that are subject to exposure to environments that include magnetic resonance imaging (MRI) machines.

BACKGROUND

Patients that may need to undergo an MRI scan may have an implantable medical device providing medical therapy. For instance, the patient may have an implantable pacemaker that applies pacing signals to the heart. Typically, for the patient to undergo the MRI scan, the implantable medical device is placed into a different mode of operation than would normally be used to avoid or minimize impacts the MRI scan may have on the operation of the implantable medical device and the medical therapy being provided during and the MRI scan. This different mode of operation may utilize different therapy programming than the normal mode of operation and is referred to herein as an exposure mode. Furthermore, the device may have MRI-specific post-exposure mode operations including diagnostics that allow the implantable medical device to provide adequate therapy once the MRI scan has completed and the original therapy programming is once again in use.

It is of particular interest that the implantable medical device be configured to automatically enter the appropriately configured exposure mode and then automatically perform appropriate post-exposure mode diagnostics to eliminate the need for medical personnel to manually program the implantable medical device to enter and exit the exposure mode and perform those post-exposure mode diagnostics. This automatic entry into and exit from the exposure mode eliminates the costly burden of having the appropriate medical personnel present to program the implantable medical device and also eliminates the potential for human error in programming the implantable medical device.

While it is beneficial to configure the implantable medical device to automatically enter the appropriately configured exposure mode and post-procedure diagnostics by detecting a magnetic field, which is always present once the patient is in proximity to the MRI machine due to powerful magnets of the MRI machine, an issue arises when detecting magnetic fields at the implantable medical device for this purpose. Where a patient is about to undergo some other medical non-MRI procedure such as surgery, it is conventional to manually place the device in a different mode of operation suitable for use during the non-MRI procedure such as an appropriately configured exposure mode by placing a magnet nearby the implantable medical device. The implantable medical device is configured to detect the magnetic field from the manually positioned magnet to automatically enter the exposure mode and post-exposure diagnostics appropriately configured for these other non-MRI procedures. The configuration of the exposure mode and/or the post-procedure diagnostics useful for non-MRI procedures such as surgery and the like may be different than for an MRI. Thus, by having the implantable medical device configured to detect a magnetic field for purposes of entering exposure mode and/or post-procedure diagnostics configured for an MRI as well as for purposes of entering exposure mode and/or post-procedure diagnostics configured for a non-MRI procedure, a conflict arises whereby the implantable device may not reliably determine which configuration of the exposure mode and/or post-procedure diagnostic procedure is appropriate for the current situation.

SUMMARY

Embodiments address issues such as these and others by providing an implantable medical device with a first sensor for detecting a magnetic field while including a second sensor that detects an MRI characteristic. Thus, upon the implantable medical device detecting a magnetic field and then detecting whether the MRI characteristic is present or not, the implantable medical device can then more reliably determine whether the situation is for an MRI or non-MRI procedure and can then automatically implement the exposure mode and/or post-procedure diagnostics that are appropriately configured.

Embodiments provide a method of controlling operations of an implantable medical device when exposed to a magnetic field. The method involves detecting a first magnetic field at a first sensor and upon detecting the magnetic field, entering an exposure mode of operation at the implantable medical device. The method further involves, while the implantable medical device is in the exposure mode, detecting whether an MRI characteristic is detected at a second sensor. When the MRI characteristic is detected at the second sensor during exposure mode, then upon concluding the exposure mode once the first sensor no longer detects the first magnetic field, the method involves performing an MRI post exposure diagnostics procedure at the implantable medical device. When the MRI characteristic is not detected at the second sensor during exposure mode, then upon concluding the exposure mode once the first sensor no longer detects the first magnetic field, the method involves performing a non-MRI post exposure diagnostics procedure at the implantable medical device.

Embodiments provide an implantable medical device that includes a first sensor for detecting a first magnetic field and a second sensor detecting whether an MRI characteristic is detected. The implantable medical device also includes a controller in communication with the first sensor and the second sensor, the controller selecting a mode of operation between a normal mode and an exposure mode. Wherein upon the first sensor detecting the magnetic field, the controller activates the exposure mode, while the exposure mode is activated, the controller detects whether an MRI characteristic is detected at a second sensor. When the MRI characteristic is detected at the second sensor during the exposure mode, then upon concluding the exposure mode once the first sensor no longer detects the first magnetic field, the controller performs an MRI post exposure diagnostics procedure. When the MRI characteristic is not detected at the second sensor during exposure mode, then upon concluding the exposure mode once the first sensor no longer detects the first magnetic field, the controller performs a non-MRI post exposure diagnostics procedure.

Embodiments provide an implantable medical system that includes an implantable medical lead having distal electrodes to output pacing signals and an implantable medical device coupled to the implantable medical lead. The implantable medical device includes a first sensor for detecting a first magnetic field and a second sensor detecting whether an MRI characteristic is detected. The implantable medical device further includes a pacing output circuit electrically coupled to the distal electrodes and a controller in communication with the first sensor, the second sensor, and the pacing output circuit. The controller selects a mode of operation between a normal mode and an exposure mode, and upon the first sensor detecting the magnetic field, the controller activates the exposure mode. While the exposure mode is activated, the controller detects whether an MRI characteristic is detected at a second sensor. When the MRI characteristic is detected at the second sensor during the exposure mode, then upon concluding the exposure mode once the first sensor no longer detects the first magnetic field, the controller performs an MRI post exposure diagnostics procedure. When the MRI characteristic is not detected at the second sensor during exposure mode, then upon concluding the exposure mode once the first sensor no longer detects the first magnetic field, the controller performs a non-MRI post exposure diagnostics procedure.

DETAILED DESCRIPTION

Embodiments of implantable medical devices implement an exposure mode and post-procedure diagnostics that are appropriate for an MRI or non-MRI type of procedure being performed for the patient by determining that exposure mode is appropriate and by determining if MRI characteristics are present. These embodiments may sense a magnetic field to trigger the use of the exposure mode and may then determine whether the MRI characteristic is present in one of various ways to determine if MRI specific exposure mode programming and/or MRI specific post-procedure diagnostics should be implemented.

Figure 1:
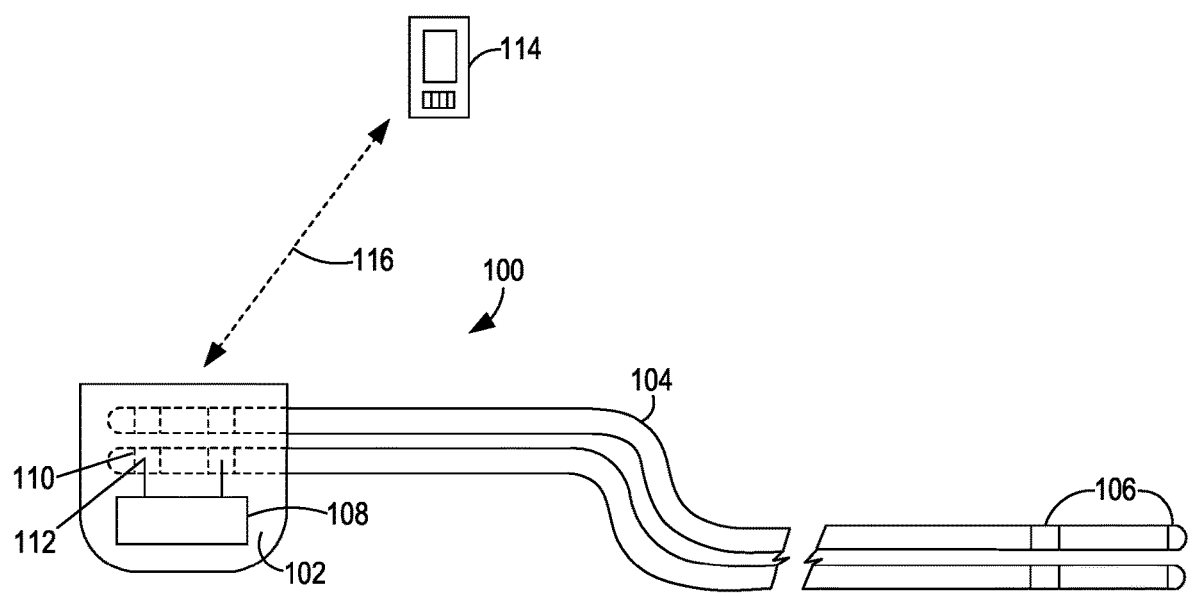
FIG. 1 shows an example of an implantable medical system.

FIG. 1 shows an example of an implantable medical system according to embodiments disclosed herein. A patient has an implantable medical system 100 which, in this example, includes an implantable medical device 102 that has the ability to perform electrical pacing and may also have the ability to perform sensing. The implantable medical device (IMD) 102 may be of various types and some of those types may offer additional functionality such as defibrillation and/or cardiac resynchronization therapy. A collection 108 of electrical components is included to provide these functions.

While the implantable medical device 102 may include stimulation and/or sensing electrodes on a housing, tine or other feature in some examples, in other examples the implantable medical device 102 may rely on a medical lead to provide the electrodes. Thus, the implantable medical system 100 in some cases may also include one or more electrical leads 104. The electrical lead(s) 104 are electrically connected to the IMD 102 via proximal contacts 110 on the leads 104 and electrical connectors 112 of the IMD 102. The leads 104 include electrodes 106 on a distal end that interface with the body tissue, for instance within the heart, to capture electrical physiologic signals or deliver electrical pacing signals.

The implantable medical system 100 in some cases may omit the use of electrical leads 104. In this embodiment without leads 104, electrodes 106 may be integrated into the IMD 102 that interface with the body tissue to capture electrical physiologic signals or deliver electrical pacing signals.

Additionally, in some cases the implantable medical system 100 may include external devices 114 such as hand-held controllers that are capable of communicating wirelessly with the IMD 102. The wireless communications may be near field, arm's length, far field and the like as is known in the art. The external device 114 may generate commands to the IMD 102 to request information about the IMD 102 and/or to instruct the IMD 102 to operate in a particular way. In particular, in some cases the external device 114 may be used to manually switch the IMD 102 to enter an exposure mode of therapy. However, the IMD 102 may additionally have the ability to automatically detect magnetic disturbances and then automatically enter the exposure mode of therapy.

Figure 2A:
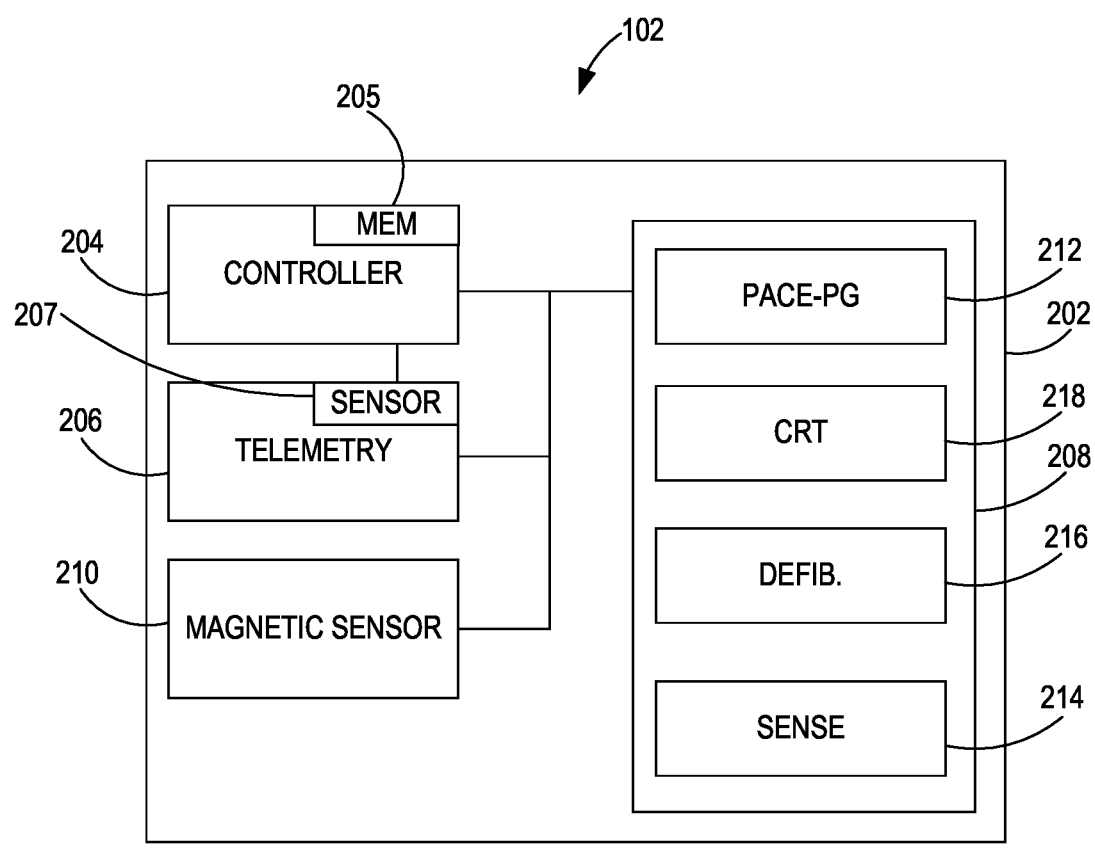
FIG. 2A shows a first example of components of an implantable medical device that includes a magnetic sensor and telemetry coil based sensor.

FIG. 2A shows a first example of components of an IMD 102. The IMD 102 may include a housing 202 that contains the various components. The IMD 102 includes a controller 204 that may control the operations of the IMD 102 by communicating with other components. The controller 204 may be of various forms such as a general-purpose programmable processor, a dedicated purpose processor, hard-wired digital logic, and the like. The controller may also include internal or external memory 205 having computer-readable instructions that, when executed by controller 204 cause controller 204 to perform various operations attributed to it in this disclosure. The memory 205 may also be used to store information such as entries logged to identify the type of exposure event that caused the IMD to enter the exposure mode. The memory 205 may include any volatile, non-volatile, magnetic, optical, or electrical media, such as a random access memory (RAM), read-only memory (ROM), non-volatile RAM (NVRAM), static non-volatile RAM (SRAM), electrically-erasable programmable ROM (EEPROM), flash memory, or any other non-transitory computer-readable storage media.

The IMD 102 may include telemetry circuitry 206 to communicate wireless with external devices such as the external device 114. As discussed above, the IMD 102 may communicate via one or more types of wireless communications including near field, arm's length, far field and the like. For instance, the telemetry 206 may include inductive coupling for near field or arm's length. Additionally, the IMD may include radio frequency far field functions such as those operating in the Medical Implant Communication Service (MICS) band.

Figure 3:
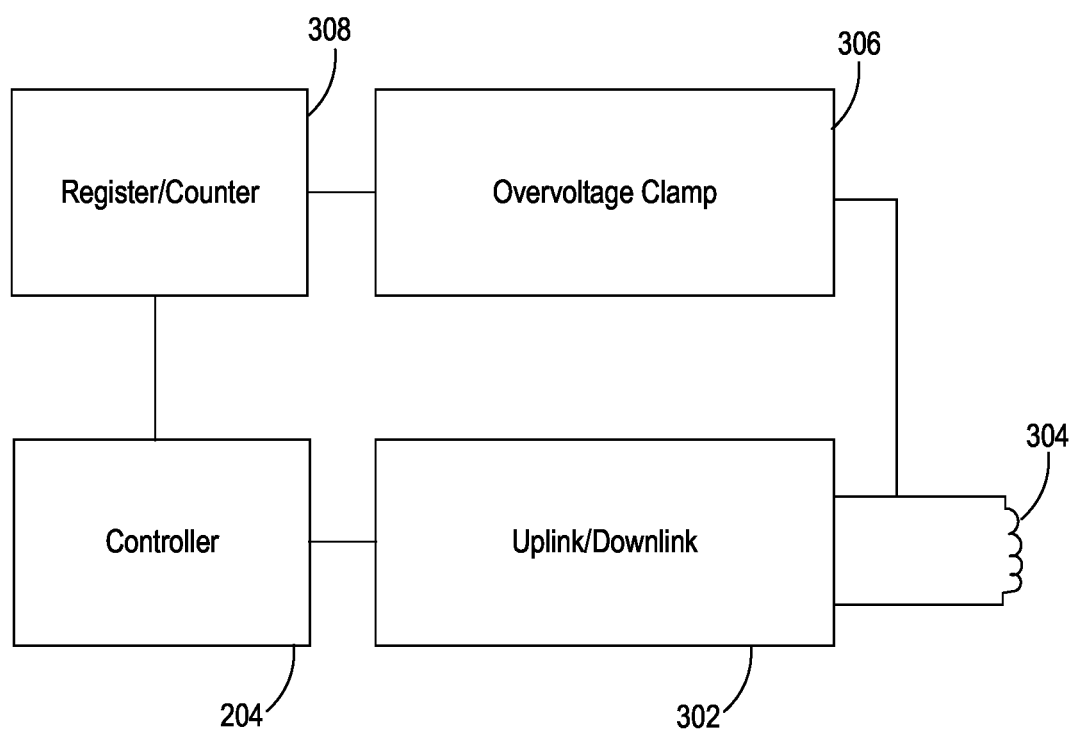
FIG. 3 shows an example of an MRI characteristic sensor of an implantable medical device that includes an overvoltage clamp.

In this example, the telemetry also includes a sensor device 207 that is capable of detecting an MRI characteristic that impacts the telemetry circuitry 206. In this example, the MRI characteristic is an overvoltage condition where the MRI machine induces the overvoltage on a telemetry coil. This sensor configuration is shown in more in FIG. 3 where it can be seen that the telemetry circuit 206 includes uplink/downlink circuitry 302 for sending and receiving signals via the telemetry coil 304 based on information provided by the controller 204. The sensor 207 includes an overvoltage clamp 306 that is coupled to the telemetry coil 304 to monitor for an overvoltage condition. Upon detecting the overvoltage condition and clamping the voltage on the coil 304, the overvoltage clamp 306 sets a bit, or increments a counter in some embodiments, in hardware register/counter 308 to signify that the overvoltage clamp 306 has been triggered by an overvoltage condition on the telemetry coil 304. The controller 204 monitors the register 308 to determine when the bit is set, or counter incremented, to determine that the MRI characteristic of overvoltage on the coil 304 is present.

The IMD 102 also includes a therapy device 208 that may include one or more engines for providing various therapy functions. For instance, the therapy device 208 may include a configurable pacing engine 212 that may pace one or more chambers of the heart via corresponding one or more electrodes of the lead 106. The therapy device 208 may include a configurable sensing engine 214 to sense from one or more chambers of the heart. Likewise, depending upon the type of IMD 102, the therapy device 208 may include a defibrillation engine 216 capable of providing high voltage defibrillation shocks. Again depending upon the type of IMD 102, the therapy device 208 may include a cardiac resynchronization engine 218 capable of provide cardiac resynchronization signals. In some embodiments a single "engine" may be used for multiple types of therapy, such as a single pacing engine that provides bradycardia pacing, anti-tachycardia pacing and/or cardiac resynchronization pacing therapy.

The engine(s) may be implemented in the form of one or more modules. For instance, a therapy delivery module may provide the pacing, resynchronization, or/or defibrillation functions. In one example, an engine may include a low voltage (LV) therapy module for delivering low voltage pacing pulses using an extra-cardiovascular pacing electrode vector selected from various electrodes. LV therapy module may be configured to deliver low voltage pacing pulses, e.g., 8 V or less or 10 V or less. One or more capacitors included in the LV therapy module are charged to a voltage according to a programmed pacing pulse amplitude by a LV charging circuit, which may include a state machine. The LV charging circuit may charge the capacitors to a multiple of the voltage of a battery included in a power source without requiring a transformer. At an appropriate time, the LV therapy module couples the capacitor(s) to a pacing electrode vector to deliver a pacing pulse to the heart.

Additionally, the IMD 102 may include one or more sensors 210 for detecting magnetic disturbances. For instance, Hall effect sensors may be used to detect whether a magnetic field of a particular intensity is present. This allows the controller 204 to then enter the exposure mode once the sensor 210 detects that the magnetic field of a given intensity is present. In the embodiment shown in FIG. 2A, the intensity may correspond to an intensity low enough that the magnetic intensity provided by the manual magnet that is used for a non-MRI procedure is adequate to trigger exposure mode. Once in the exposure mode, the controller 204 may then distinguish whether the circumstances are such that the IMD is being exposed to an MRI scan or a non-MRI procedure by detecting whether an MRI characteristic is present in one of various ways, such as by using the sensor 207 discussed above. The controller 204 may then implement the exposure mode and/or post-procedure diagnostics that are appropriate for the circumstances when the exposure mode is triggered and the MRI characteristic is present.

Figure 2B:
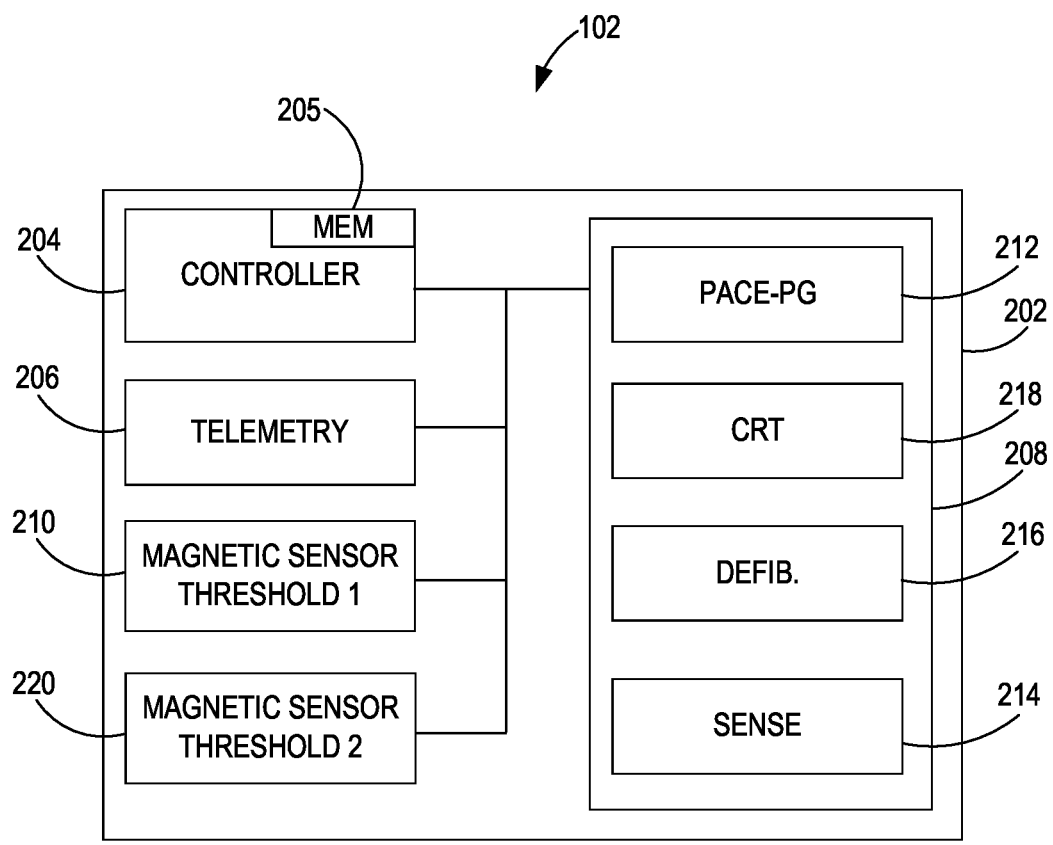
FIG. 2B shows a second example of components of an implantable medical device that includes a multi-magnetic threshold based sensor.

FIG. 2B shows a second example of an implantable medical device 102. This example in FIG. 2B differs from the example in FIG. 2A because the sensor 207 is not necessarily present but there is a multi-threshold magnetic sensor configuration. The multi-threshold magnetic sensor configuration may be implemented either as a dual threshold sensor, such as a dual threshold Hall Effect sensor, or as separate sensors 210, 220 with different thresholds of magnetic intensity. In either case, the first threshold is below the magnetic intensity provided by the manual magnet that signals a non-MRI procedure. The second threshold is greater than the magnetic intensity provided by the manual magnet but less than the magnetic intensity provided by the MRI machine. Detecting a magnetic intensity greater than the first threshold allows exposure mode to be triggered while detecting a magnetic intensity greater than the second threshold establishes that an MRI characteristic is present so that MRI appropriate post-procedure diagnostics may be implemented.

Figure 2C:
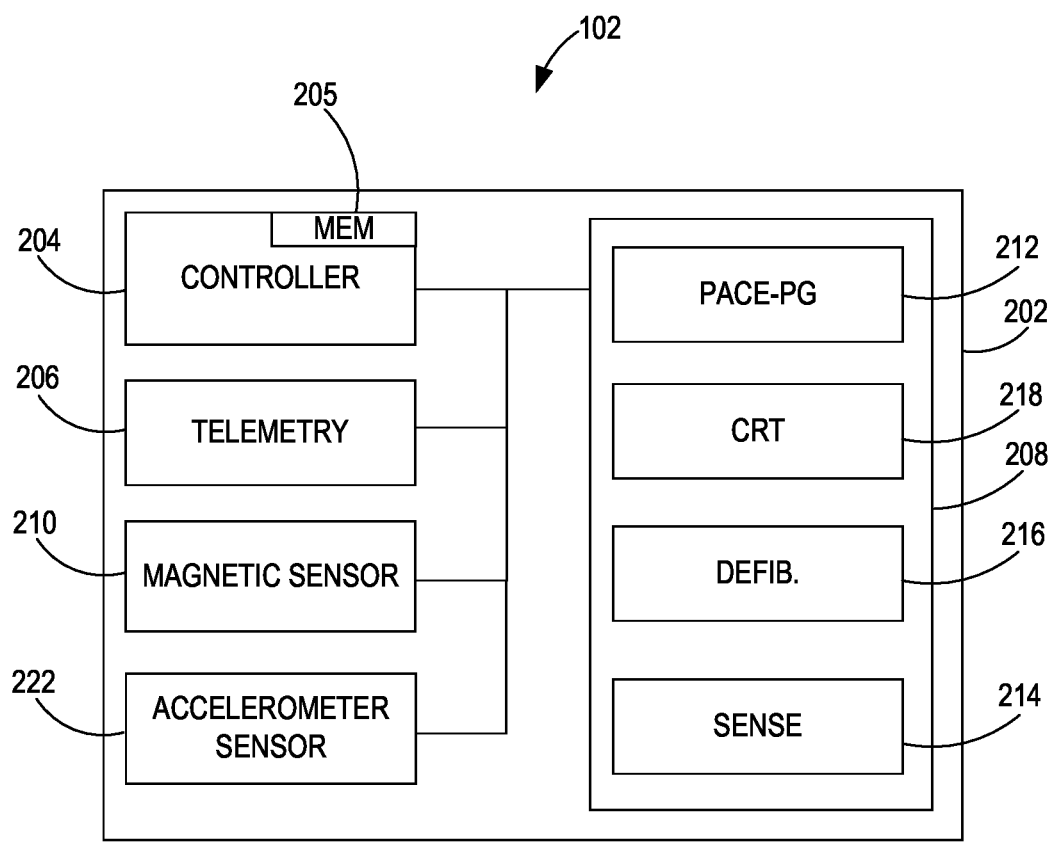
FIG. 2C shows a third example of components of an implantable medical device that includes a magnetic sensor and an accelerometer based sensor.

FIG. 2C shows a third example of an implantable medical device 102. This example in FIG. 2C differs from the prior examples because the sensor 207 and dual threshold magnetic sensing are not necessarily present but there is an accelerometer sensor 222. The accelerometer sensor 222 may be a multi-axis accelerometer and detect an acceleration magnitude and produce a corresponding signal which the controller 204 receives to determine whether an MRI characteristic is present. The accelerometer sensor 222 may detect accelerations of the IMD 102 caused by magnetic gradient induced vibration when the MRI machine is present. Detecting a sufficient magnetic intensity at the magnetic sensor 210 allows exposure mode to be triggered while detecting a sufficient acceleration of the IMD 102 that exceeds an acceleration threshold at the acceleration sensor 222 establishes that an MRI characteristic is present so that MRI appropriate post-procedure diagnostics may be implemented.

Figure 2D:
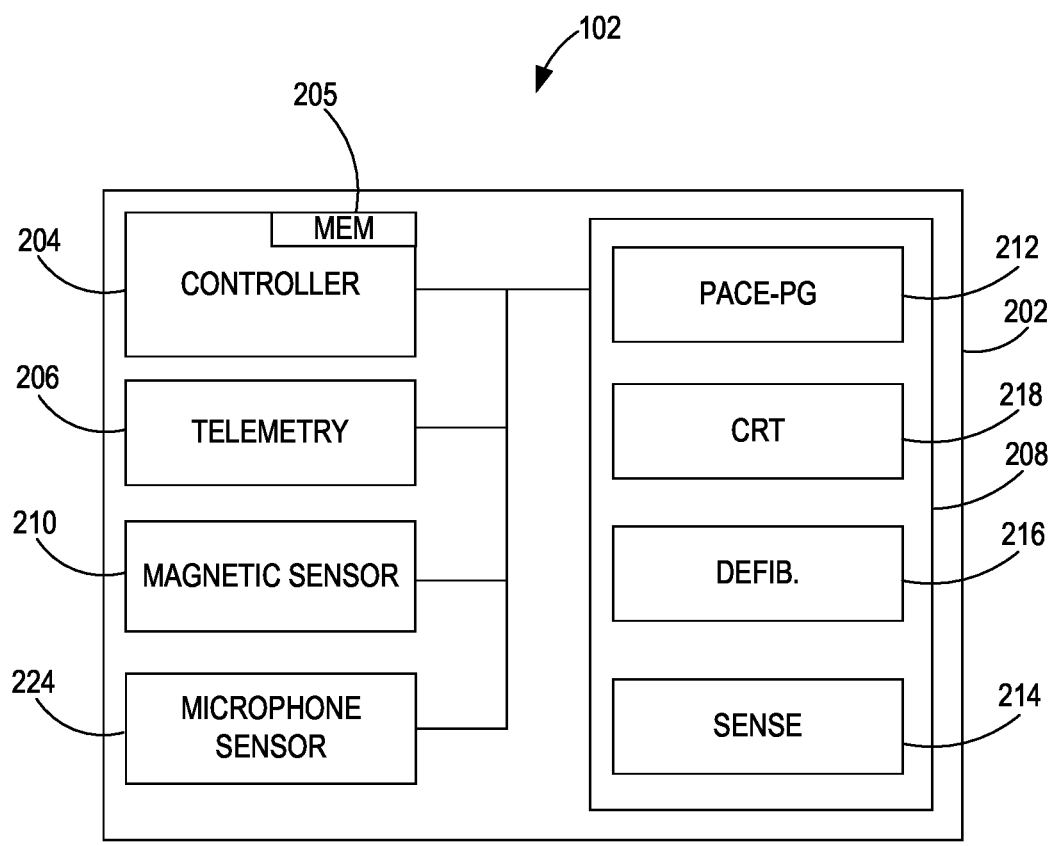
FIG. 2D shows a fourth example of components of an implantable medical device that includes a magnetic sensor and a microphone based sensor.

FIG. 2D shows a fourth example of an implantable medical device 102. This example in FIG. 2D differs from the prior examples because the sensor 207, the second threshold magnetic sensing 220, and the accelerometer sensor 222 are not necessarily present but there is a microphone sensor 224. The microphone sensor 224 detects acoustic energy and produce a corresponding signal which the controller 204 receives to determine whether an MRI characteristic is present. The microphone sensor 224 may detect acoustic energy at the IMD 102 caused by loud sounds created by the MRI machine. Detecting a sufficient magnetic intensity at the magnetic sensor 210 allows exposure mode to be triggered while detecting a sufficient amount of acoustic energy at the IMD 102 that exceeds an acoustic threshold by the microphone sensor 224 establishes that an MRI characteristic is present so that MRI appropriate post-procedure diagnostics may be implemented.

Figure 4:
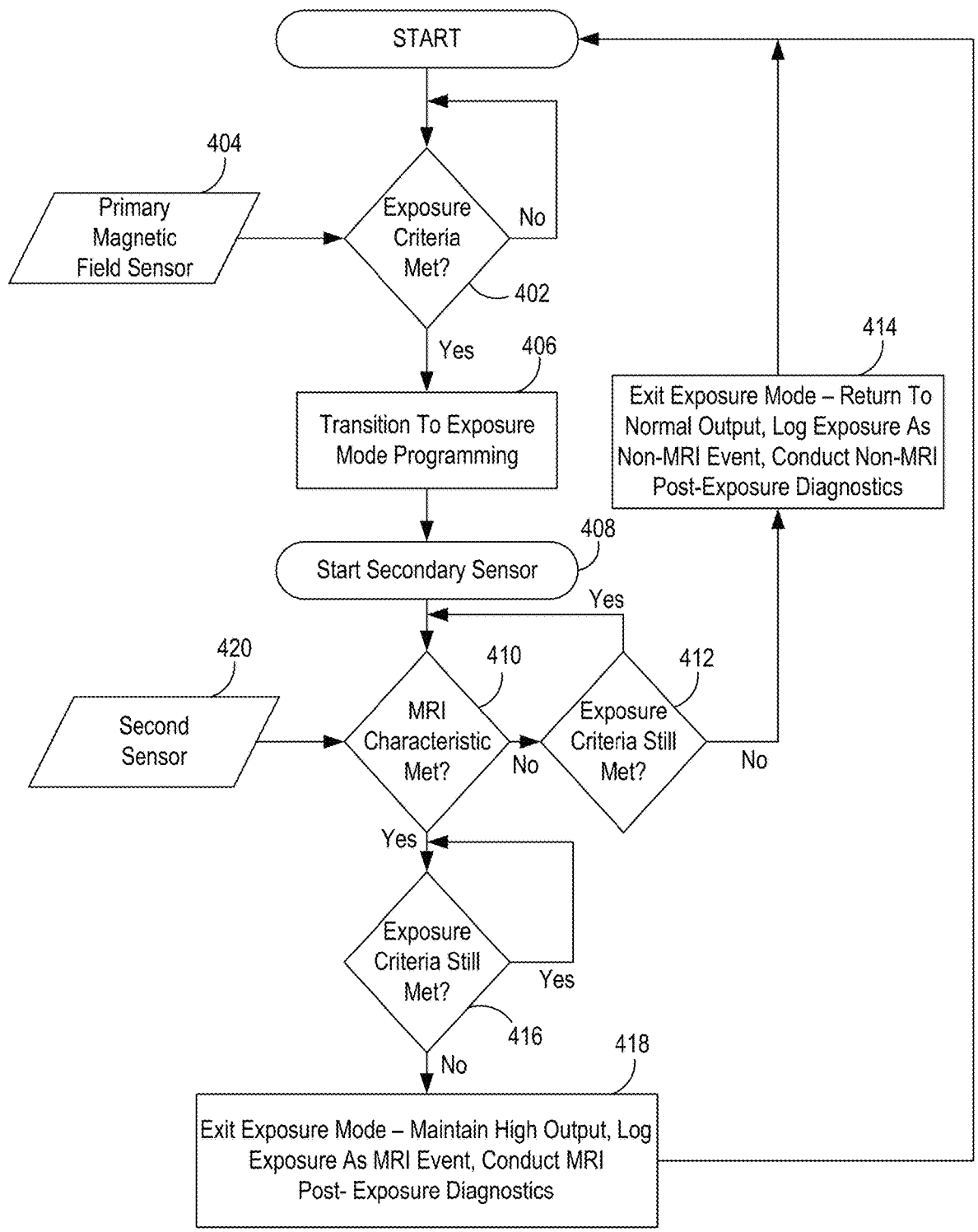
FIG. 4 shows a first example of operations performed by an implantable medical device to implement an exposure mode.

The controller 204 may perform a set of operations to implement the exposure mode and appropriate post procedure diagnostics. FIG. 4 shows one example of these operations. Initially, at operation 402 the controller 204 repeatedly polls the output 404 of the primary magnetic sensor 210 for whether the criteria for entering the exposure mode are met. As discussed above, this criteria may be whether the intensity of the magnetic field that is present exceeds a threshold causing the magnetic sensor 210 to output a signal indicative of such.

Once the criteria for exposure mode is met, the controller 204 then selects to enter exposure mode and transitions to the exposure mode programming at an operation 406. In the case of a pacing IMD, the exposure mode may dictate the rate as either fixed or triggered, the pulse width, the amplitude, and the chambers of the heart to be paced. The pacing output amplitude and/or pulse width may be increased during exposure mode relative to the amplitude used during a normal mode in use prior to the exposure mode to better ensure pacing capture occurs during the MRI or non-MRI procedure.

While in the IMD 102 is in the exposure mode, the controller 204 then activates a second sensor at operation 408 and begins polling the output 420 of a second sensor, such as from the overvoltage clamp sensor 207, the second threshold magnetic sensor 220, the accelerometer sensor 222, or the microphone sensor 224 at an operation 410. When the MRI characteristic is not detected by the second sensor such that the second sensor output 420 fails to indicate that the MRI characteristic is present, the controller 204 continues to poll the primary magnetic sensor 210 to confirm that the exposure mode criteria are still met at an operation 412. When the exposure mode criteria are still met, the controller 204 continues to poll the second sensor regarding whether the MRI characteristic is present.

Once the operation 412 detects that the exposure mode criteria are no longer met at the primary magnetic field sensor 210, then at an operation 414 the controller 204 exits the exposure mode to return to normal mode programming, including returning the normal pacing output amplitude. This is possible because the non-MRI procedure does not affect the post exposure capture of the pacing signals. Additionally at operation 414, the controller 204 logs a reason for the instance of entering the exposure mode as a non-MRI event in the memory 205 so that subsequent considerations of exposure mode will be informed as to whether the exposure mode was necessary because of an MRI or non-MRI procedure. The controller 204 may then conduct any non-MRI post exposure diagnostics such as device functional checks to ensure proper operation.

Returning to the operation 410, if and when the second sensor output 420 indicates that the MRI characteristic is present, then the controller 204 continues to poll the primary magnetic sensor 210. From this polling, the controller 204 continues to confirm that the exposure mode criteria are still met at an operation 416.

Once the operation 416 detects that the exposure mode criteria are no longer met at the primary magnetic field sensor 210, then at an operation 418 the controller 204 exits the exposure mode to return to normal mode programming but may maintain certain exposure mode characteristics such as the increased pacing output amplitude of the exposure mode. This is preferable because the MRI procedure and specifically any radio frequency heating during the MRI scan may have affected the post exposure capture of the pacing signals.

Additionally at operation 418, the controller 204 logs a reason for the instance of entering the exposure mode as an MRI event in the memory 205 so that subsequent considerations of exposure mode will be informed as to whether the exposure mode was necessary because of an MRI or non-MRI procedure. The controller 204 may then conduct any MRI post exposure diagnostics such as automatic pacing capture threshold tests to ensure that pacing capture is occurring. Other MRI specific post exposure tasks may also be performed, such as automatically communicating via telemetry transmissions regarding the post exposure operations and results of any post exposure diagnostic tests such as the pacing capture threshold tests.

It will be noted that in the example of FIG. 4, the controller 204 maintains the increased pacing output amplitude and performs the automatic pacing capture threshold tests after an MRI and not after a non-MRI procedure. As the non-MRI procedure does not create the potential RF heating shift in the pacing capture threshold, there is no need for those MRI related post exposure actions. This saves on-board power of the IMD 102 and improves IMD longevity.

Figure 5:
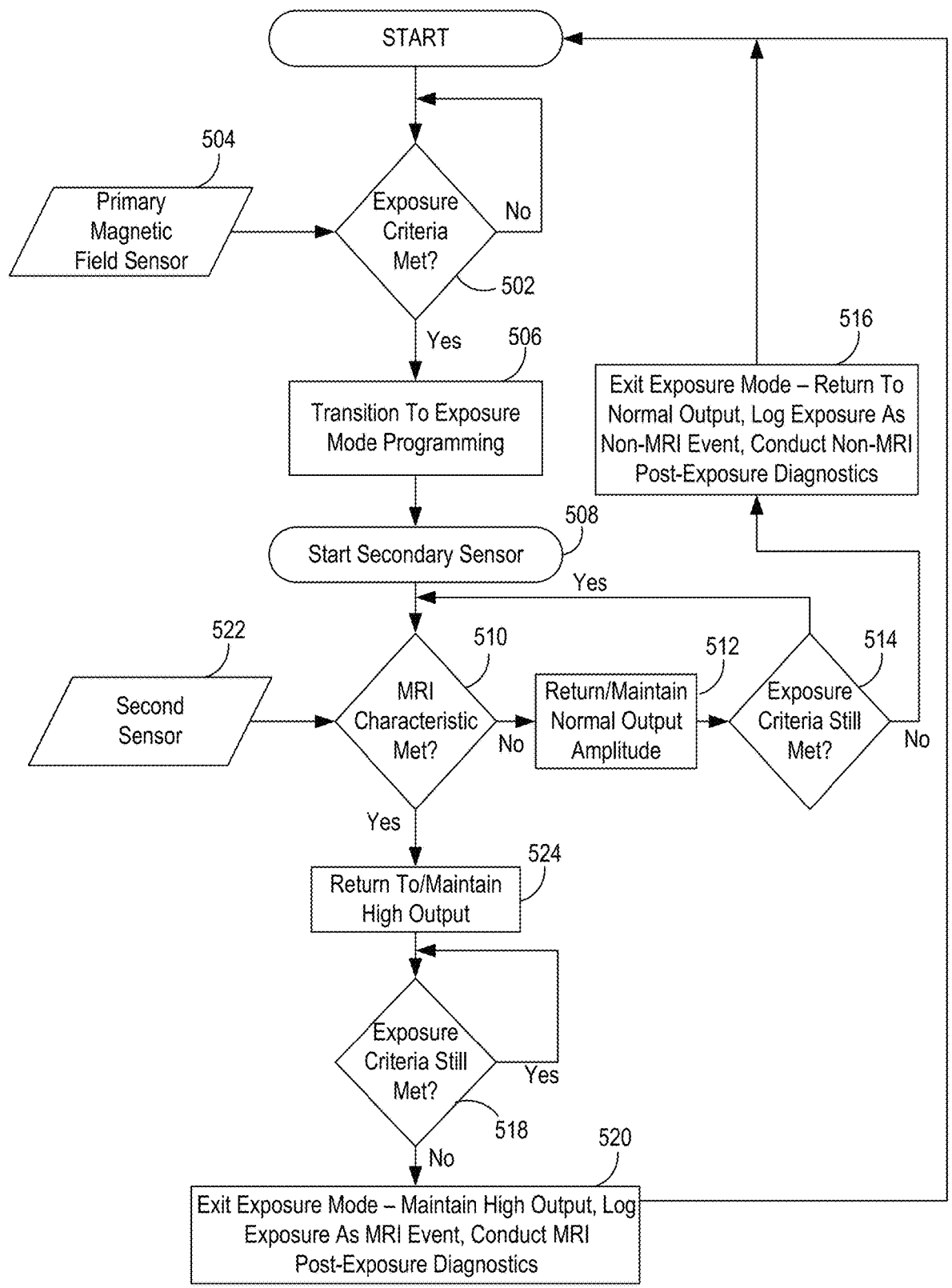
FIG. 5 shows a second example of operations performed by an implantable medical device to implement an exposure mode.

The controller 204 may alternatively perform a different set of operations to implement the exposure mode and appropriate post procedure diagnostics. FIG. 5 shows an alternative example of these operations. Initially, at operation 502 the controller 204 repeatedly polls the output 504 of the primary magnetic sensor 210 for whether the criteria for entering the exposure mode are met. As discussed above, this criteria may be whether the intensity of the magnetic field that is present exceeds a threshold causing the magnetic sensor 210 to output a signal indicative of such.

Once the criteria for exposure mode is met, the controller 204 then transitions to the exposure mode programming at an operation 506. In the case of a pacing IMD, the exposure mode may dictate the rate as either fixed or triggered, the pulse width, the amplitude, and the chambers of the heart to be paced. The pacing output amplitude and/or pulse width may be increased during exposure mode relative to the amplitude used during a normal mode in use prior to the exposure mode to better ensure pacing capture occurs during the MRI.

While in the IMD 102 is in the exposure mode, the controller 204 then activates a second sensor at 508 and begins polling the output 522 of the second sensor, such as from the overvoltage clamp sensor 207, the second threshold magnetic sensor 220, the accelerometer sensor 222, or the microphone sensor 224 at an operation 510. When the MRI characteristic is not detected by the second sensor such that the second sensor output 522 fails to indicate that the MRI characteristic is present, the controller 204 then returns the pacing output amplitude to the normal level while maintaining other exposure mode programming at an operation 512. The normal pacing output amplitude may be used during the non-MRI procedure where there is no expected drift of the pacing capture threshold, and maintaining the normal pacing output amplitude reduces the likelihood of causing phrenic nerve stimulation that causes an undesired hiccup like movement of the diaphragm of the patient. The controller 204 also continues to poll the primary magnetic sensor 210 to confirm that the exposure mode criteria are still met at an operation 514. When the exposure mode criteria are still met, the controller 204 continues to poll the second sensor regarding whether the MRI characteristic is present.

Once the operation 514 detects that the exposure mode criteria are no longer met at the primary magnetic field sensor 210, then at an operation 516 the controller 204 exits the exposure mode to return to normal mode programming, including maintaining the normal pacing output amplitude. This is again possible because the non-MRI procedure does not affect the post exposure capture of the pacing signals.

Additionally at operation 516, the controller 204 logs the instance of entering the exposure mode as a non-MRI event in the memory 205 so that subsequent considerations of exposure mode will be informed as to whether the exposure mode was necessary because of an MRI or non-MRI procedure. The controller 204 may then conduct any non-MRI post exposure diagnostics such as device functional checks to ensure proper operation.

Returning to the operation 510, if and when the second sensor output 522 indicates that the MRI characteristic is present, then the controller 204 returns or maintains the pacing output amplitude to the increased exposure mode level at an operation 524. For instance, if the pacing output amplitude had previously been returned to normal at the operation 512, then it is returned to the increased level at operation 524 to be appropriate for the MRI. Then the controller 204 continues to poll the primary magnetic sensor 210 to confirm that the exposure mode criteria are still met at an operation 518.

Once the operation 518 detects that the exposure mode criteria are no longer met at the primary magnetic field sensor 210, then at an operation 520 the controller 204 exits the exposure mode to return to normal mode programming but maintains the increased pacing output amplitude of the exposure mode. This is again preferable because the MRI procedure and specifically any radio frequency heating during the MRI scan may have affected the post exposure capture of the pacing signals.

Additionally at operation 520, the controller 204 logs the instance of entering the exposure mode as an MRI event in the memory 205 so that subsequent considerations of exposure mode will be informed as to whether the exposure mode was necessary because of an MRI or non-MRI procedure. The controller 204 may then conduct any MRI post exposure diagnostics such as automatic pacing capture threshold tests to ensure that pacing capture is occurring. Other MRI specific post exposure tasks may also be performed, such as automatically communicating via telemetry transmissions regarding the post exposure operations and results of the pacing capture threshold tests.

It will be noted that also in the example of FIG. 5, the controller 204 maintains the increased pacing output amplitude and performs the automatic pacing capture threshold tests after an MRI and not after a non-MRI procedure. As the non-MRI procedure does not create the potential RF heating shift in the pacing capture threshold, there is no need for those MRI related post exposure actions. As previously discussed, this saves on-board power of the IMD 102 and improves IMD longevity.

As described above, providing the IMD 102 with the ability to detect whether criteria for entering the exposure mode are met while also detecting whether an MRI characteristic is present, the IMD 102 can transition to the exposure mode as needed and provide the appropriate exposure mode and post exposure diagnostics and other actions.

While embodiments have been particularly shown and described, it will be understood by those skilled in the art that various other changes in the form and details may be made therein without departing from the spirit and scope of the invention.

What is claimed is:

1. An implantable medical device, comprising:
a first sensor for detecting a first magnetic field;
a second sensor detecting whether an MRI characteristic is detected; and
a controller in communication with the first sensor and the second sensor, the controller selecting a mode of operation between a normal mode and an exposure mode,
wherein upon the first sensor detecting the magnetic field, the controller activates the exposure mode, while the exposure mode is activated, the controller detects whether an MRI characteristic is detected at a second sensor,
when the MRI characteristic is detected at the second sensor during the exposure mode, then upon concluding the exposure mode once the first sensor no longer detects the first magnetic field, the controller performs an MRI post exposure diagnostics procedure, and
when the MRI characteristic is not detected at the second sensor during exposure mode, then upon concluding the exposure mode once the first sensor no longer detects the first magnetic field, the controller performs a non-MRI post exposure diagnostics procedure.

2. The implantable medical device of claim 1, further comprising a memory in communication with the controller, and wherein when the MRI characteristic is detected at the second sensor during exposure mode, then the controller logs a reason for entering the exposure mode as an MRI event in the memory of the implantable medical device.

3. The implantable medical device of claim 2, wherein when the MRI characteristic is not detected at the second sensor during exposure mode, then the controller logs a reason for entering the exposure mode as a non-MRI event in the memory of the implantable medical device.

4. The implantable medical device of claim 1, wherein the first sensor is a Hall effect sensor of the implantable medical device.

5. The implantable medical device of claim 1, further comprising a telemetry circuit in communication with the controller and coupled to a telemetry coil, and wherein the second sensor is a overvoltage clamp coupled to the telemetry coil and the MRI characteristic is an overvoltage occurring on the telemetry coil that triggers the overvoltage clamp.

6. The implantable medical device of claim 1, further comprising a pacing output circuit and wherein when the controller selects the exposure mode, the controller causes the pacing output circuit to increase a pacing output amplitude and wherein the controller performs the MRI post exposure diagnostics procedure by maintaining the increased pacing output amplitude of the pacing output circuit.

7. The implantable medical device of claim 6, wherein the controller performs the non-MRI post exposure diagnostics procedure by returning the pacing output circuit to a pacing output amplitude in use prior to the controller selecting the exposure mode.

8. The implantable medical device of claim 1, wherein the controller performs the MRI post exposure diagnostics procedure by performing pacing capture threshold tests.

9. The implantable medical device of claim 1, further comprising a pacing output circuit, and wherein when the MRI characteristic is not detected at the second sensor during exposure mode, then the controller causes the pacing output circuit to maintain a pacing output amplitude in use prior to entering the exposure mode.

10. An implantable medical system, comprising
an implantable medical lead having distal electrodes to output pacing signals; and an implantable medical device coupled to the implantable medical lead and comprising:
- a first sensor for detecting a first magnetic field;
- a second sensor detecting whether an MRI characteristic is detected;
- a pacing output circuit electrically coupled to the distal electrodes; and
- a controller in communication with the first sensor, the second sensor, and the pacing output circuit, where the controller selects a mode of operation between a normal mode and an exposure mode,
- wherein upon the first sensor detecting the magnetic field, the controller activates the exposure mode, while the exposure mode is activated, the controller detects whether an MRI characteristic is detected at a second sensor,
- when the MRI characteristic is detected at the second sensor during the exposure mode, then upon concluding the exposure mode once the first sensor no longer detects the first magnetic field, the controller performs an MRI post exposure diagnostics procedure, and
- when the MRI characteristic is not detected at the second sensor during exposure mode, then upon concluding the exposure mode once the first sensor no longer detects the first magnetic field, the controller performs a non-MRI post exposure diagnostics procedure.

11. The implantable medical system of claim 10, further comprising:
- a memory in communication with the controller;
- a telemetry circuit coupled to a telemetry coil and in communication with the controller; and
- wherein when the MRI characteristic is detected at the second sensor during exposure mode, then the controller logs a reason for entering the exposure mode as an MRI event in the memory of the implantable medical device,
- wherein when the MRI characteristic is not detected at the second sensor during exposure mode, then the controller logs a reason for entering the exposure mode as a non-MRI event in the memory of the implantable medical device.

12. The implantable medical system of claim 10, wherein the first sensor is a Hall effect sensor of the implantable medical device and wherein the second sensor is an overvoltage clamp coupled to a telemetry coil and the MRI characteristic is an overvoltage occurring on the telemetry coil that triggers the overvoltage clamp.

13. The implantable medical system of claim 10, wherein when the controller selects the exposure mode, the controller causes the pacing output circuit to increase a pacing output amplitude, wherein the controller performs the MRI post exposure diagnostics procedure by maintaining the increased pacing output amplitude of the pacing output circuit and by performing pacing capture threshold tests, and wherein the controller performs the non-MRI post exposure diagnostics procedure by returning the pacing output circuit to a pacing output amplitude in use prior to the controller selecting the exposure mode.

14. A method of controlling operations of an implantable medical device when exposed to a magnetic field, comprising:
- detecting a first magnetic field at a first sensor;
- upon detecting the magnetic field, entering an exposure mode of operation at the implantable medical device;
- while the implantable medical device is in the exposure mode, detecting whether an MRI characteristic is detected at a second sensor;
- when the MRI characteristic is detected at the second sensor during exposure mode, then upon concluding the exposure mode once the first sensor no longer detects the first magnetic field, performing an MRI post exposure diagnostics procedure at the implantable medical device; and
- when the MRI characteristic is not detected at the second sensor during exposure mode, then upon concluding the exposure mode once the first sensor no longer detects the first magnetic field, performing a non-MRI post exposure diagnostics procedure at the implantable medical device.

15. The method of claim 1, wherein when the MRI characteristic is detected at the second sensor during exposure mode, then logging a reason for entering the exposure mode as an MRI event in memory of the implantable medical device.

16. The method of claim 1, wherein when the MRI characteristic is not detected at the second sensor during exposure mode, then logging a reason for entering the exposure mode as a non-MRI event in memory of the implantable medical device.

17. The method of claim 1, wherein the first sensor is a Hall effect sensor of the implantable medical device.

18. The method of claim 1, wherein the second sensor is an overvoltage clamp on a telemetry coil of the implantable medical device and the MRI characteristic is an overvoltage occurring on the telemetry coil that triggers the overvoltage clamp.

19. The method of claim 1, wherein the first and second sensor are provided by a multi-magnetic threshold sensor where the first sensor has a first threshold and the second sensor has a second threshold that is higher than the first threshold, and wherein the MRI characteristic is a magnetic field intensity that exceeds the second threshold.

20. The method of claim 1, wherein the second sensor is an accelerometer and the MRI characteristic is an acceleration that exceeds an acceleration threshold.

21. The method of claim 1, wherein the second sensor is a microphone and the MRI characteristic is an amount of acoustic energy that exceeds an acoustic threshold.

22. The method of claim 1, wherein entering the exposure mode causes an increase in pacing output amplitude of the implantable medical device and wherein the MRI post exposure diagnostics procedure comprises maintaining the increased pacing output amplitude at the implantable medical device.

23. The method of claim 22, wherein the non-MRI post exposure diagnostics procedure comprises returning to a pacing output amplitude in use prior to entering the exposure mode.

24. The method of claim 1, wherein the MRI post exposure diagnostics procedure comprises performing pacing capture threshold tests at the implantable medical device.

25. The method of claim 1, wherein when the MRI characteristic is not detected at the second sensor during exposure mode, then maintaining a pacing output amplitude in use prior to entering the exposure mode.

* * * * *